United States Patent [19]

Braun et al.

[11] Patent Number: 4,664,584

[45] Date of Patent: May 12, 1987

[54] ROTARY WHEELCHAIR LIFT

[75] Inventors: Ralph W. Braun; Edward A. Czech, both of Winamac; Keith L. Heath, Monon, all of Ind.

[73] Assignee: The Braun Corporation, Winamac, Ind.

[21] Appl. No.: 714,485

[22] Filed: Mar. 21, 1985

[51] Int. Cl.[4] .................. B60P 1/44

[52] U.S. Cl. .................. 414/541; 187/8.52; 187/9 R; 414/921

[58] Field of Search .................. 414/541, 539, 540, 545, 414/921, 549, 550; 187/8.52, 9 R

[56] References Cited

U.S. PATENT DOCUMENTS

| | | | |
|---|---|---|---|
| 3,638,813 | 2/1972 | Strong | 414/921 X |
| 3,710,962 | 1/1973 | Fowler, Jr. | 414/545 |
| 3,737,009 | 6/1973 | Stoddard | 187/8.52 X |
| 3,847,292 | 11/1974 | Williams et al. | 414/921 X |
| 4,113,121 | 9/1978 | Collins et al. | 414/545 |
| 4,121,695 | 10/1978 | Carpenter | 414/539 |
| 4,124,130 | 11/1978 | Rohrs et al. | 414/921 X |
| 4,133,437 | 1/1979 | Gates | 414/541 |
| 4,479,753 | 10/1984 | Thorley | 414/921 X |
| 4,480,719 | 11/1984 | Risner | 187/8.52 |
| 4,493,602 | 1/1985 | Koerber | 414/541 |
| 4,493,603 | 1/1985 | Williams et al. | 414/921 X |
| 4,534,450 | 8/1985 | Savaria | 414/921 X |
| 4,551,056 | 11/1985 | Risner | 414/921 X |

FOREIGN PATENT DOCUMENTS

| | | | |
|---|---|---|---|
| 2137163 | 10/1984 | United Kingdom | 414/545 |

*Primary Examiner*—Joseph E. Valenza
*Assistant Examiner*—David A. Bucci
*Attorney, Agent, or Firm*—Jacques M. Ltd. Dulin

[57] ABSTRACT

A rotary wheelchair lift comprising a hydraulic lift having a vertically telescoping slide tube and a horizontal wheelchair platform support arm attached to the lower end thereof. The arm supports a wheelchair platform having a front safety barrier, a rear entry ramp which folds up to become a rear wheel safety barrier, and a platform extension horizontally movable to accomodate wheelchairs of various sizes and types. A switch box and safety handrail assembly is mounted on the upper end of the slide tube. An UP/DOWN swtich causes the platform to be raised or lowered. An IN/-OUT switch causes the platform to be rotated into or out of the van around a vertical axis offset from, but parallel to, the slide tube. A latching lever releases the handrail into a vertically downward position where it folds back the front safety barrier which interlocks the extension against horizontal motion preventing falls by able-bodied users traversing the platform. The retraction of the horizontal safety handrail permits unrestricted access to the interior of the vehicle through the side, slide door of the van.

29 Claims, 14 Drawing Figures

ROTARY WHEELCHAIR LIFT

FIELD

This application relates to improved wheelchair lifts, and more particularly to a rotary hydraulic lift which provides unrestricted entry through the slide door on the side of a van on which a lift mechanism is mounted. The lift has an oversized platform with a slidable extension which can accept almost any sized manual or electric wheelchair. The platform has a fold-down handrail which, once the lift has risen and rotated 90 degrees into the van folds down out of the way to provide unrestricted entry through the side slide door of the van for full use by able-bodied passengers.

BACKGROUND

The advent of the wheelchair lift some years ago has provided wheelchair users access to vehicles which increased their mobility and permitted them to take part in a more self-reliant, fully functional lifestyle. A principal type of lift particularly useful with sliding door vans is the rotary type lift. In these lifts, the wheelchair user rolls onto a platform which is then vertically lifted adjacent the side of the van. Once the platform is at the floor level of the van, it is rotated 90 degrees into the van, whereupon the wheelchair user can roll off the platform in the interior of the van and take a position as a passenger or driver of the van.

Present commercially available types of lifts (such as the ABC brand lift, the Golden Boy brand lift, the Collins "Swing Lift" and the Drive-Master brand lift) are all variations on a "basket type" lift. That is, such lifts have a platform or pan suspended from a basket-type handle space above and spanning the platform. The basket handle has two vertical risers, one on either side of the platform connected by a horizontal cross-member spaced above the lift platform. The horizontal cross-member serves as a handrail, permitting the wheelchair user to hold onto the lift while it is being moved vertically and rotated into or out of the van.

The horizontal handrail in such commercially available basket lifts also serves as the principal horizontal support member from which the platform is suspended. As the platform is lowered, it becomes suspended below the lower end of the lift mechamism mounted in the van. In the Collins Lift, for example, one of the vertical riser support members suspended from the horizontal structural handrail is guided by a fixed roller located adjacent the lower end of the lift mechanism mounted in the van.

All of these structures suffer from various amounts of side sway when the suspended wheelchair platform drops below the lower end of the lift mechanism mounted in the vehicle during vertical travel. In instances where the vehicle is not parked on level ground, such as in sloped parking, the platform pan or vertical riser can actually strike the side of the vehicle and damage the vehicle or the lift. In extreme cases it may bind and prevent proper vertical travel of the lift. This is particularly the case when the platform is loaded, with user plus wheelchair weighing on the order of 200–450 lbs.

Further, when the lift is then rotated into the van, the horizontal bar and the two risers remain in a fixed position. The horizontal bar remains fixed and is spaced approximately three feet above the floor of the van. This prevents free access into the van and restricts full usage of the van by able bodied users such as support personnel, family members or drivers. The van thus becomes single-use dedicated, i.e. dedicated to wheelchair use. Such use limitation may be a severe economic hardship to most families.

Still further, VA certification for wheelchair lifts requires certain platform sizes and load carrying capacity, among other lifting characteristics. It has become necessary to beef up lifts in order to meet the needs of increasingly sophisticated certification requirements. For the basket type of lifts this means that the handrail structural support assembly becomes heavier, and the access and free usage of the van is even further restricted.

Accordingly, there is a need in the art for a wheelchair lift which is safe, economical and permits complete vehicle access without restrictions against multifunctional vehicle use. There is a need in the art for a wheelchair lift which is able to carry the increased load requirements of modern day usage, and which is safe, stable and has a relatively low sway when the platform pan is moved vertically below the lower end of the lift. There is a need in the art for such lifts to be able to accomodate an increasingly wide variety of sizes of wheelchairs, both manual and motorized, of various makes, models and types. There is further need in the art to provide a safety handrail which does not restrict vehicle access for able bodied users.

THE INVENTION

Objects

It is among the objects of the invention to provide an improved rotary wheelchair lift having a fold-down safety handrail which permits unrestricted access to the interior of the vehicle in which the lift assembly is mounted.

It is another object of the invention to provide an improved wheelchair lift of the rotary type which has an improved assembly for supporting the wheelchair platform from beneath the platform itself.

It is another object of the invention to provide an improved rotary wheelchair lift assembly in which the platform support and lifting mechanism does not require a basket handle type of platform support having vertical risers on both sides of the platform.

It is another object of the invention to provide an improved wheelchair lift in which the platform can be released, manually rotated and lifted or lowered by hand powered hydraulic pump in the event of power loss.

It is another object of the invention to provide an improved wheelchair lift having an axially longitudinally extending platform member which can accommodate a wide variety of wheelchair types, including both handpowered and electrical wheelchairs, yet in which wheel safety barriers (stops) are completely retractable so that there is full and free access to the vehicle in which the wheelchair lift assembly is mounted.

It is another object of the invention to provide an improved wheelchair lift assembly in which a fold-down safety handrail interengages the front safety barrier of the wheelchair platform extension to prevent its sliding movement when the platform is in the retracted position in the vehicle.

It is another object of the invention to provide an improved wheelchair lift in which the movable platform extension is securely locked when the platform is in the retracted position so that the platform may be traversed with safety by able-bodied users.

Still further and other objects of the invention will be evident from the Summary, Detailed Description and Drawings of the invention.

BREIF DESCRIPTION OF THE DRAWINGS

The invention is described in more detail below in reference to the drawings in which.

SUMMARY

Figure 1:
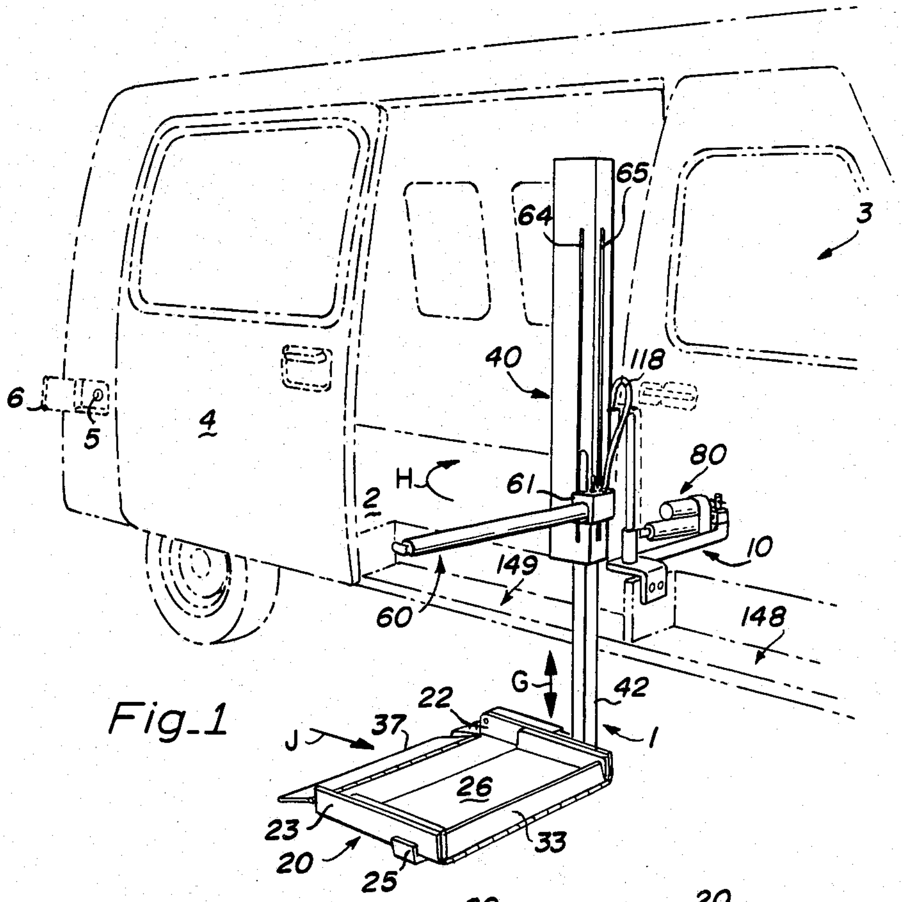
FIG. 1 is a ¾ perspective of the improved wheelchair lift of this invention showing the lift in position lowered to the pavement adjacent the vehicle in which it is mounted ready for entry by the wheelchair user.

Applicant's improved rotary wheelchair lift comprises in operative combination a vertical lift device having a telescoping slide tube which is hydraulically actuated for vertical raising or lowering, and a horizontal wheelchair platform support arm attached to the lower end of the telescoping slide tube. Secured on the platform support arm is a wheelchair platform having an entry ramp which folds up to become a rear wheel safety barrier, and a platform extension mounted on upright side rails which extension is horizontally movable to accommodate wheelchairs of various sizes, types and makes. The front edge of the platform extension comprises a front safety barrier which may be rotated through approximately 90 degrees from a horizontal position overlapping the front edge of the platform extension to an approximately vertical position to act as a front safety barrier or lip.

The platform support slide tube telescopes upwardly into a receiving tube portion of the lift assembly. A switch box assembly is mounted on the slide tube adjacent the upper end thereof. The switch box assembly has two main functions: first, it contains the controls for the vertical lift as well as the rotary displacement of the platform into and out of the van; and second, it supports a fold-down safety handrail with a spring-biased latch mechanism which permits the handrail to be latched in an upper, horizontal position, or released to be folded down parallel to the slide tube. The safety handrail may be grasped by the wheelchair user when the wheelchair is in position on the platform.

Upon actuation of an UP/DOWN switch on the switch box, a hydraulic piston will raise or lower, as the case may be, the platform into the position desired by the wheelchair user. Upon actuating an IN/OUT switch, the platform will be either rotated into the van or out of the van 90 degrees around a vertical axis offset from, but parallel to, the slide tube. Upon rotating into position in the van, the wheelchair user may then roll backward off of the platform into position as a driver or passenger of the vehicle.

The latching lever of the horizontal handrail may then be actuated to release the handrail, dropping it into a vertically downward position. A special tab assembly on the outer end of the handrail engages the front safety barrier flap portion of the platform extension, folding it backwardly down onto the upper face of the platform extension. The underside of the front safety barrier contains an elongated tab which passes through a pair of aligned slots in both the platform extension and the main platform therebeneath, so that when the handrail is folded down in the vertical position, the elongated tab effectively interlocks the upper platform extension from horizontal motion. This prevents a horizontal sliding action of the platform extension which would be dangerous to able-bodied users of the vehicle when getting into and out of the vehicle by stepping on the platform extension. If it were not interlocked, the platform extension could move out under the horizontal vector force of a person's stepping motion causing the person to fall, with potential injuries.

In addition, the horizontal safety handrail, now being dropped to the vertical position, is out of the way and provides unrestricted free access to the interior of the vehicle through the side, slide door of the van. There is no horizontal fixed. platform support/handrail extending across the opening approximately 30 inches to 3 feet above the van floor level. In addition, there is no vertical riser on either the inside or the outside edge of the platform, which, when present, not only takes up space but also hinders access to the interior of the vehicle.

The rotary motion of the lift assembly is provided by a linear actuator of a recirculating ball type, which is activated only when the lift is in the raised position. A safety interlock switch is provided to prevent rotary motion when the lift is descending below the van floor level. The rear end (or inner end) of the linear actuator can be disengaged so that the wheelchair platform and lift assembly may be pivoted by hand into and out of the van.

In addition, a backup hand-actuated hydraulic pump is provided to permit raising and lowering of the wheelchair platform in the event of hydraulic or electrical power loss.

An outside control panel mounted behind a hinged, lockable door may be provided on the vehicle in a convenient place for access by the wheelchair user. This permits the wheelchair user to activate the lift mechanism from the exterior. In combination with an automatic electric or hydraulic powered sliding door opening and closing mechanism, this will permit the wheelchair user to have complete and sole control and access to the vehicle. Thus, the wheelchair user can activate the slide door to open, and the rotary lift to swing out of the van and descend to the pavement. The wheelchair user can then roll up onto the platform, activate the lift from the control box adjacent the inner end of the safety handrail, lift and rotate him or herself into the van, wheel off the platform to the van controls as the driver. The sliding door can then be automatically closed and the wheelchair user be on his or her way with total mobility.

The platform and vertically telescoping slide tube to which it is engaged by the platform support arm thereunder is lifted and lowered by a hydraulic piston acting on a pair of heavy-duty chains. The chains are affixed at the upper end of the lift assembly and pass thence downwardly under a pair of rollers, spindled to a yoke attached to the hydraulic piston. The chains thence pass upwardly over a pair of fixed rollers and down through the center hollow space in the slide tube. One of the chains is fixed to the base of the platform while the second chain extends horizontally adjacent the inner edge of the platform and passes over a spring-biased latch assembly to the entry ramp/rear safety barrier. When the hydraulic piston moves downwardly, the platform is raised, and vice versa. On the initial motion of the piston in the downward direction, the longer chain extending to the rear entry ramp raises the ramp so that it becomes the safety barrier contacting the rear wheel of the wheelchair on the platform. As it does this, it automatically engages a pair of safety latches which pass through slots in a latch plate at the the inner edge of the entry ramp/rear safety barrier. Upon the safety barrier being latched into position, the entire platform commences to rise. Upon pivoting into the van and switching the vertical lift into the down position, the rear safety barrier is unlatched and pivots downwardly to contact the floor of the van so the wheelchair user can roll off of the platform into the van proper.

DETAILED DESCRIPTION OF THE PREFERRED EMBODIMENT

The detailed description of the preferred embodiment which follows has reference to the figures, and is by way of example and not by way of limitation of the principles of the invention.

Referring now to FIG. 1, this figure illustrates, in a $\frac{3}{4}$ front perspective the lift assembly 1 of this invention secured to the floor 2 of a van 3 (shown in phantom) having a side slide-opening type door 4. Mounting bracket assembly 10 is shown in more detail in FIG. 13. An external control panel 5 is positioned behind a lockable, hinged door 6 in a place convenient to be reached by a wheelchair user, such as on the right rear sidewall of the van as shown. By this control panel 5, as described in more detail in connection with FIG. 14, the wheelchair user can electrically actuate the side opening door of the van to slide open, and the lift to rotate out and descend to the pavement for entry in the direction of the arrow J (FIG. 1). The user thus gains complete mobility for unassisted entry and use of the van as transportation.

The lift assembly 1 comprises: a platform assembly 20; a vertically reciprocable lifting mechanism 40 (principally contained within housing 41 and described in more detail in connection with FIGS. 2 and 9); a switch box and handrail assembly 60, and a linear actuator assembly 80 for rotating the lift platform assembly 20 and the lifting mechanism assembly 40 into and out of the van.

Figure 2:
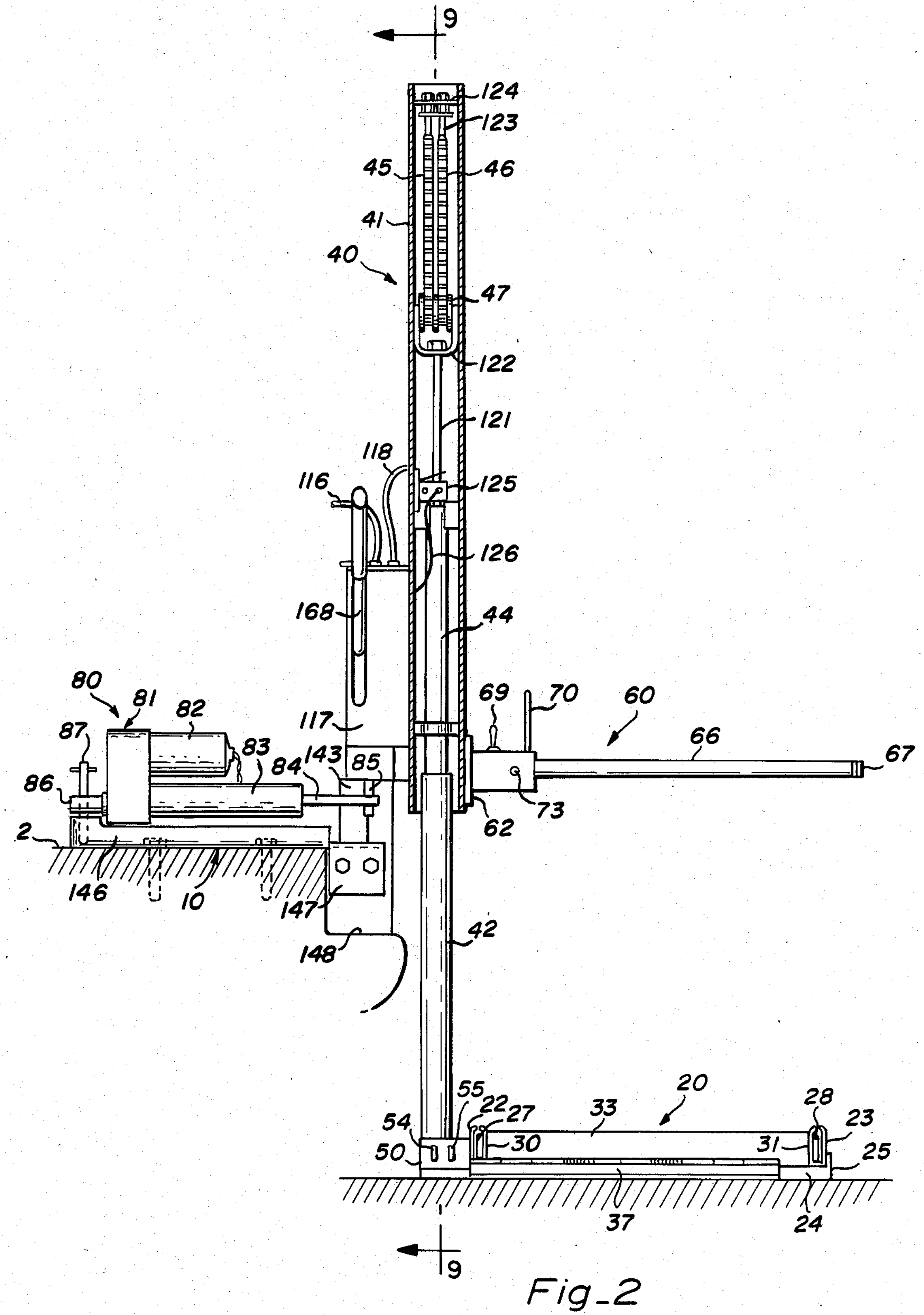
FIG. 2 is an elevation view from the rear showing the improved wheelchair lift of this invention in the lowered position of FIG. 1.
Figure 9:
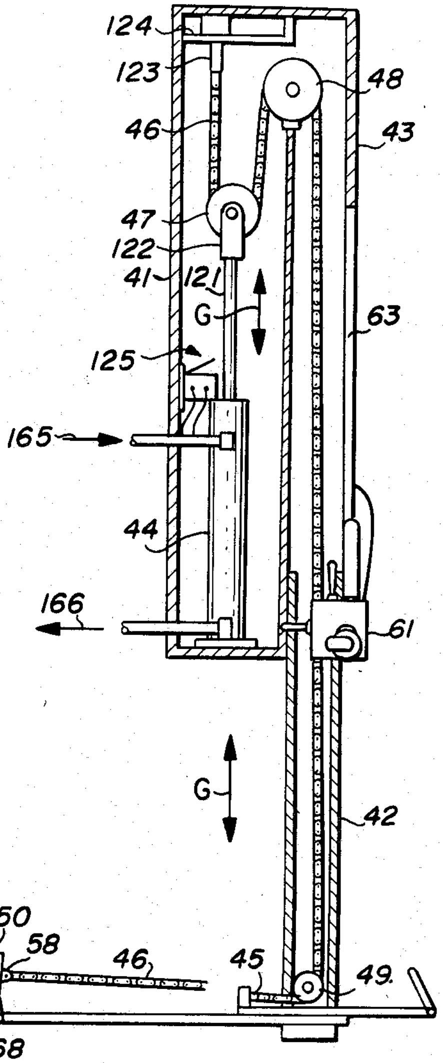
FIG. 9 is a vertical elevation view, partly in section, along the line 9—9 of FIG. 2 showing the vertical lift assembly and chain hoist linkage.
Figure 10:
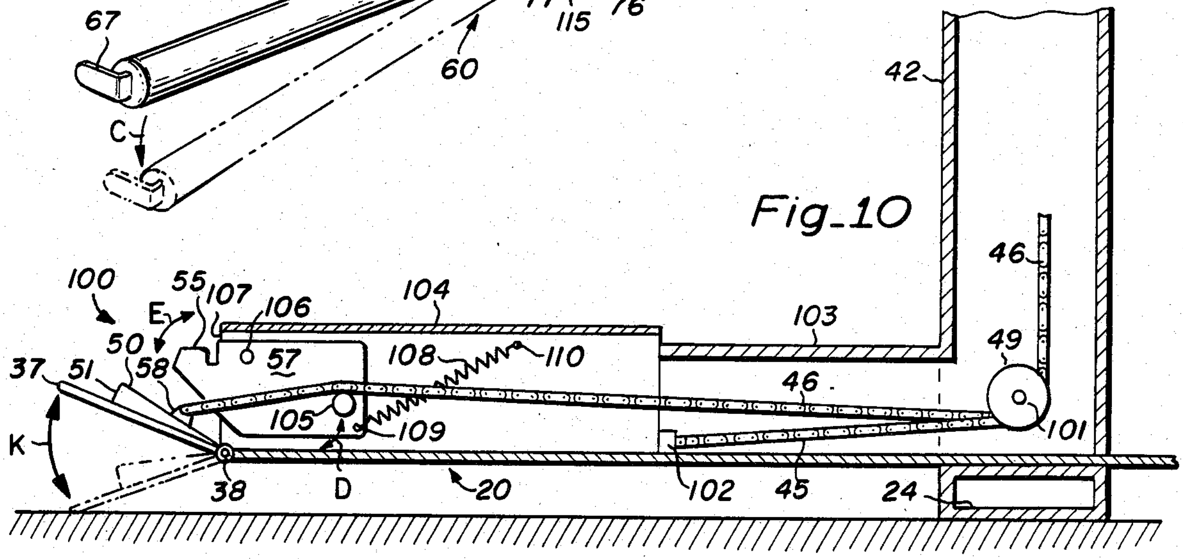
FIG. 10 is a vertical section through the lower portion of the slide tube and lift arm showing the operation of the rear entry ramp/safety barrier and latch plate mechanism.

The platform assembly is lifted vertically by the lifting mechanism assembly 40 by means of slide tube 42 being telescopically raised or lowered in receiving tube portion 43 of housing 41 by means of a hydraulic piston acting a heavy duty dual chain 45, 46 passing over and under grooved rollers 47, 48 and 49, respectively, as best seen in FIGS. 2, 9 and 10. The switchbox 61 is mounted to the slide tube 42 adjacent the upper end thereof and rides with it as it slides vertically up or down. It is mounted by means of brackets 62 and 63 which pass through slots 64, 65, respectively, in the housing 41. This is best seen in FIG. 4.

Figure 3:
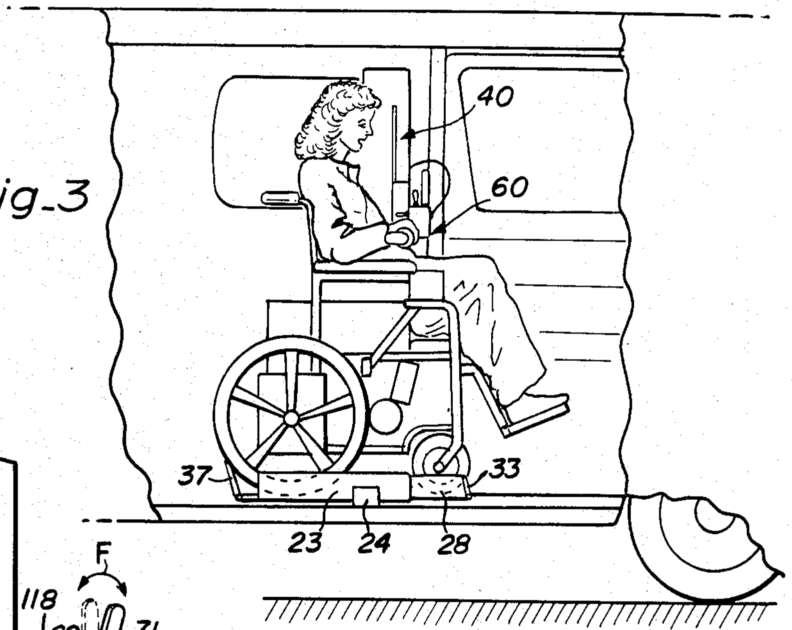
FIG. 3 is a side elevation view of wheelchair user in position on the platform, grasping the safety handrail, already lifted vertically and about to be rotated into the van.
Figure 4:
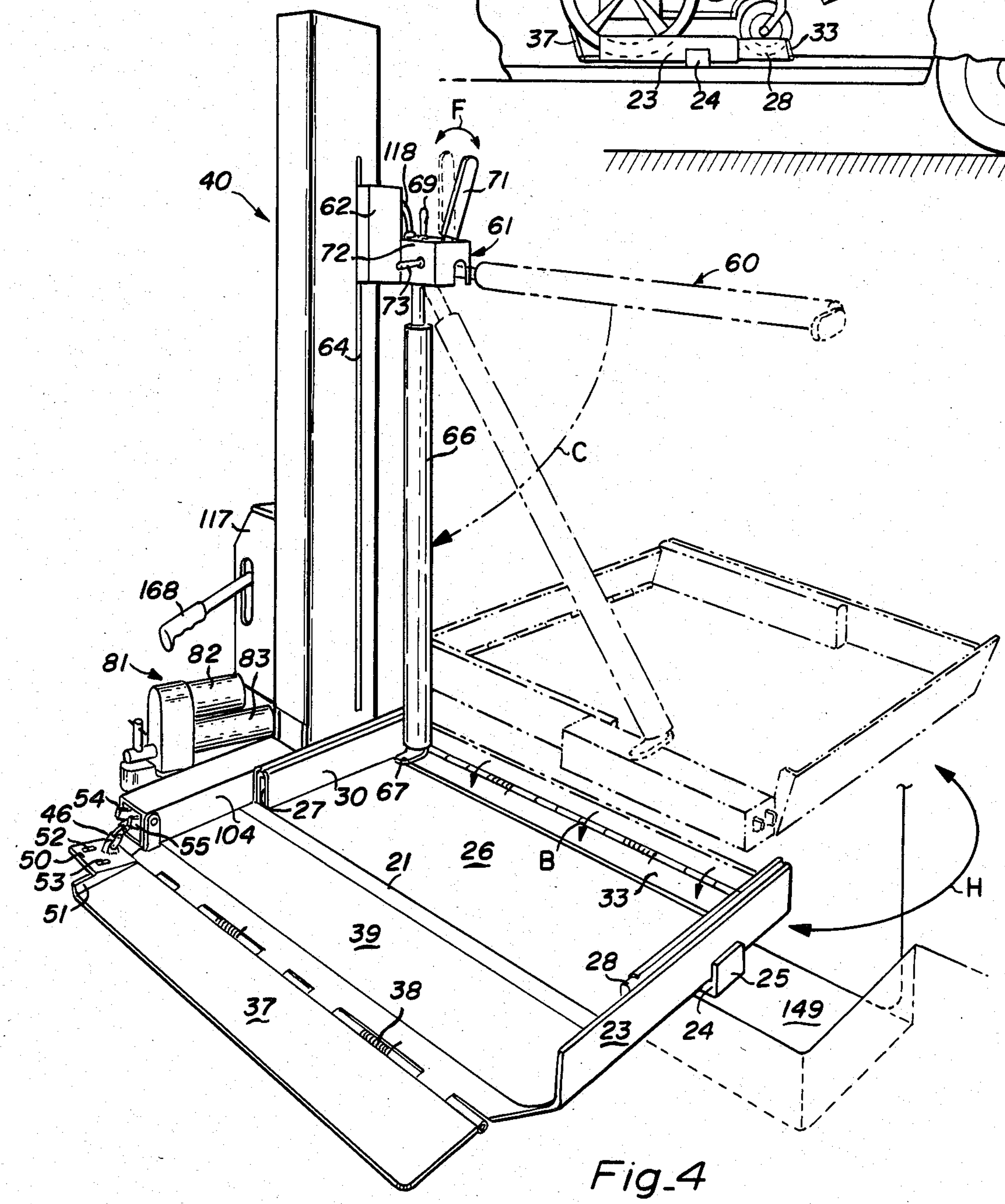
FIG. 4 is a ¾ perspective of the improved wheelchair lift of this invention showing in a first position the wheelchair platform retracted into the van, and in a second position (in phantom) the platform rotated out for vertical drop to the pavement.

The details of the platform assembly are best seen in connection with FIGS. 2–8. The platform assembly 20 comprises a lower pan 21, which is U-shaped in cross section, having inner and an outer upraised margins 22, 23 respectively. This pan is fixed to and supported by a transverse support arm 24 which is secured at its inner end to the bottom of the slide tube 42. The outer end has an upraised lip, 25 which acts as a lateral keeper of the lower pan 21. As best seen in FIG. 3, the platform support arm 24 supports the entire weight of the platform assembly with wheelchair and user while being lifted vertically adjacent to the side wall of the vehicle. This support arm can be dimensioned to support any desired load size without restricting access to the vehicle as it fits into the rear stepwell recess 149 as seen in FIG. 4.

Figure 6:
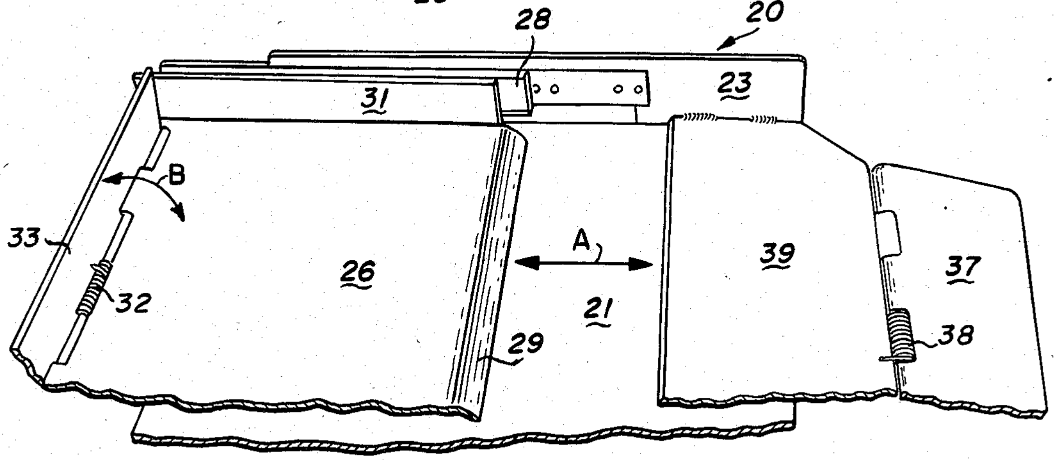
FIG. 6 is a detailed perspective of a portion of the platform assembly showing the horizontal sliding action of the platform extension.

A longitudinally movable platform extension 26 is mounted inside the upraised lips 22, 23 of the lower pan 21 by means of co-acting roller slides (drawer slides) 27, 28. The platform extension 26 is likewise U-shaped in cross section and is mounted with its forward edge coordinate with the forward edge of the lower pan 21. The trailing edge 29 of the platform extension 26 is bent downwardly to provide a shallow ramp. The sliding motion of the platform extension is best shown in FIG. 6 by the arrow A. The inner drawer slide 27 is mounted between the upraised lip 22 of pan 21 and the upraised lip 30 of extension 26, while the outer drawer slide 28 is mounted between the outer upraised lip 23 of pan 21 and the upraised lip 31 of extension 26.

Figure 8:
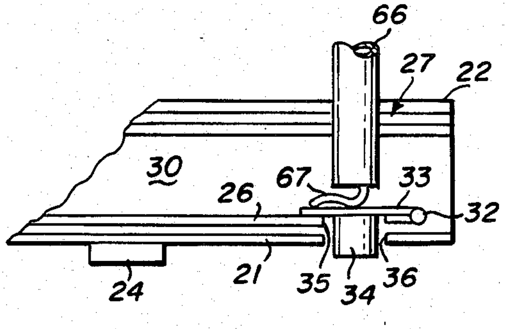
FIG. 8 is a side section view of the front safety barrier lock assembly taken along line 8—8 of FIG. 7.
Figure 5:
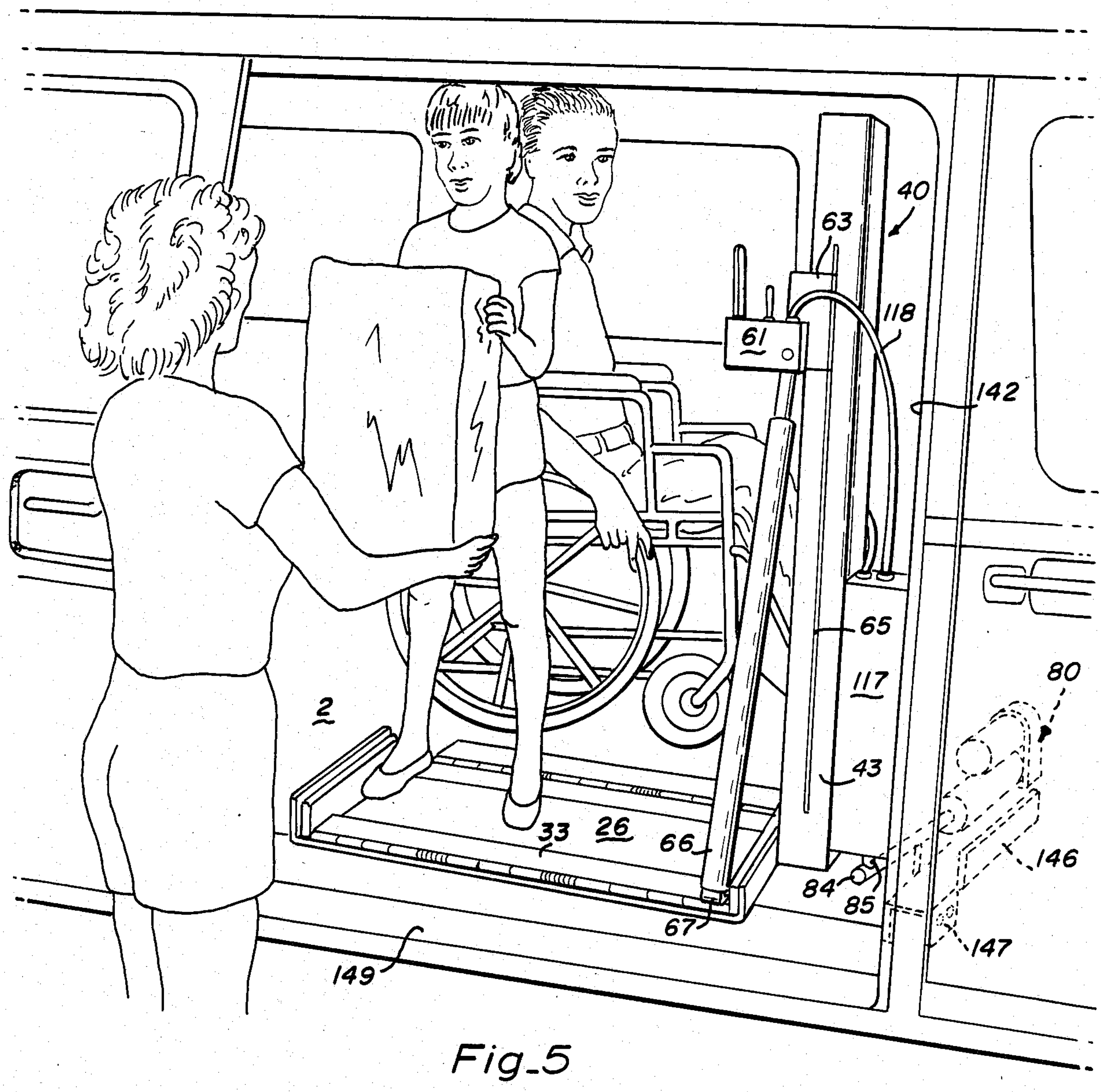
FIG. 5 shows an elevation perspective of the improved wheelchair assembly in the retracted position in the van in which the safety handrail is locked in the down position for unrestricted access and use by able-bodied persons.
Figure 7:
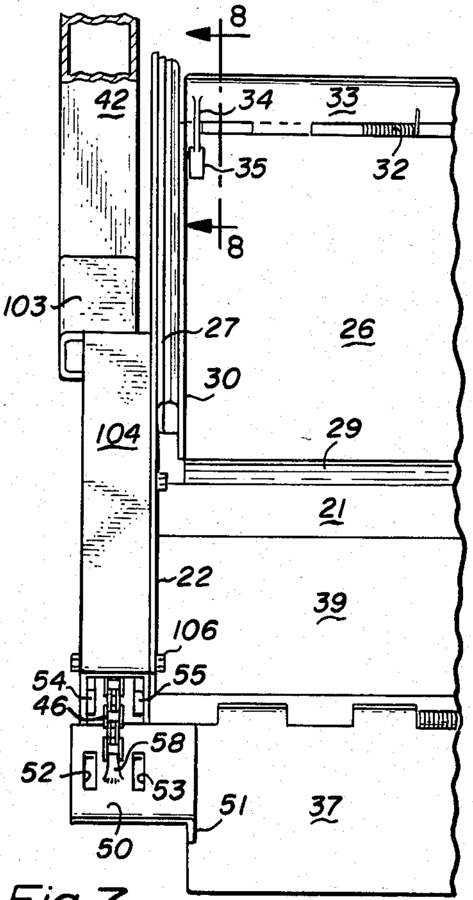
FIG. 7 is a partial perspective from the top showing the rear safety barrier latch assembly, and the front safety barrier platform lock assembly.

A front safety barrier 33 is connected to the forward edge of the platform extension 26 by a spring-biased hinge 32. Barrier 33 is normally biased in an up position by the spring 32. The safety barrier is canted slightly backward from vertical as best seen in FIG. 1. As best seen in FIGS. 4, 7 and 8, adjacent the inner margin of the front safety barrier 33 is an elongated tab 34, which, when the front safety barrier is pressed backwards and downwards into contact with the platform extension 26, passes through aligned slot 35 in platform extension 26 and slot 36 in the lower pan 21. As best seen in FIGS. 4, 5 and 8, when the safety handrail 66 is in the down positioned, a tab 67 on the end thereof causes the front safety barrier to rotate backwardly into contact with the platform extension 26 and the elongated tab 34 passes through the two slots, locking the platform extension 26 in position. As best seen in FIG. 5, an able-bodied user is thus able to step onto the platform without it sliding out from under him or her. The pivoting of the front safety barrier is shown by arrows B in FIGS. 4 and 6, and the pivoting of the handrail 66 to the vertical position is shown by arrow C in FIG. 4.

FIGS. 2–7 and 10 show in detail the arrangement, function and operation of the entry ramp/rear safety barrier 37 which is attached to the rear edge of a platform plate 39 by spring-biased hinge 38. Plate 39 is secured to the pan 21, for example, by welds at each side edge as shown in FIG. 6. The ramp is biased normally in the down position by spring 38 as seen in FIGS. 1, 2 and 4–6. As best seen by comparing FIGS. 1 and 3, after the wheelchair user rolls onto the platform via the deployed ramp 37, the UP/DOWN switch on the switch box 61 is activated by pressing it to the UP position. As best seen in FIGS. 4 and 10, the chain 46 is attached at its lower end to a latch plate 50 which extends laterally inwardly from the inner edge of the entry ramp/rear safety barrier 37. As chain 46 is retracted, the entry ramp rises against the force of spring 38 (See arrow K in FIG. 10) until it contacts the rear tire of the wheelchair (as best seen in FIG. 3), whereupon it becomes a rear safety barrier. The safety barrier may urge the wheelchair slightly forward further extending the platform extension 26 until the wheels of the wheelchair are securely engaged between the front safety barrier 33 and the rear safety barrier 37. Depending on the particular make, model and type of wheelchair, the drawer slides 27 and 28 will extend an appropriate amount to accomodate for the front to back dimension of the wheelchair. The drawer slides are normally biased rearwardly by internal springs (not shown) so that the movable platform is normally in a closed or retracted position as best seen in FIG. 4.

As best seen in FIG. 4, the latchplate 50 is attached to the inner side margin of the entry ramp 37 by a wedge shaped upstanding lip 51. Because of the wedge shape, the latchplate precedes (in terms of angular rotational motion) the entry ramp 37 so that the entry ramp remains at an acute angle (less than 90 degrees) with respect to the horizontal when it comes into contact with the rear wheel of the wheelchair as best seen in FIG. 3.

As best seen in FIGS. 2, 4, 7 and 10, the latchplate 50 contains a pair of slots 52, 53 which receive notched tabs 54, 55 in a pair of spaced-apart pivot plates 56, 57. These notched tabs 54, 55 securely engage the upper edges of slots 52, 53 in the latchplate 50 to act as a safety latch preventing the entry ramp from descending until pressure is relieved from the chain 46.

The operation of safety latch assembly 100 is best shown in FIG. 10. As noted above, there are two heavy-duty lifting chains passing downwardly through the slide tube 42. These chains pass under a lower pully assembly 49 which is rotatably fixed on a center pin 101. The chains pass under the roller in grooves therein to maintain the lateral spacing of the chains. The first chain 45 is fixed at its lower end to connector 102 secured to longitudinal extension 103 of the slide tube 42. The other chain 46 continues on through housing 104 and is pivotally connected at its lower end to the latchplate 50 by end connector 58. Chain 46 passes over a guide pressure rod 105. This steel rod 105 connects the two latch pivot plates 56 and 57. The two plates are free to pivot on rod 106 which passes through the housing 104 adjacent its rear opening 107. The pivot plates are generally rectangular with the notched tab extension in each formed in the rear margin thereof. The tab extension is so dimensioned as to provide appropriate clearance through the slot in the latchplate 50. Opposite the pivot rod 106 is a spring 108 secured at its back end to the pivot plate 57 by connector 109, and at its forward end to housing 104 by connector 110. When the chain 46 is relaxed, the spring draws the forward end of the pivot plate 57 in a counter clockwise direction (see arrow D), thus causing the indented tooth portion 55 of the pivot plate to release the latchplate 50 so that the entry ramp/rear barrier 37 can descend into contact with the pavement or the floor of the van, as shown by arrow K. Conversely, when the chain 46 is under tension, it pushes down on the guide/pressure rod 105 forcing the tooth 55, upwardly as shown by arrow E in FIG. 10, to secure the latchplate 50 from becoming disengaged. So long as the chain is under tension, that is, during lifting or lowering, the entry ramp is safety latched as a rear safety barrier in the raised position.

Figure 11:
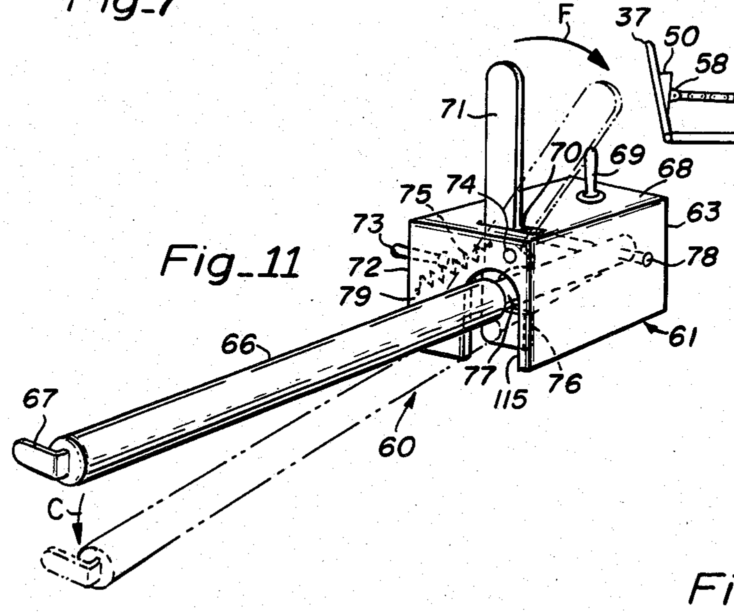
FIG. 11 shows in a ¾ front perspective the operation of the fold-down safety handrail in a first, horizontal position, and its ability to pivot downwardly as shown in phantom.

The detail of the switch box and handrail assembly 60 is shown in connection with FIGS. 2, 4 and 11. The switchbox 61 is an inverted U-shape in cross section with closed ends 63 and 79. It is mounted adjacent the upper end of slide tube 42 by a pair of brackets, angle bracket 62 extending from its rear face 72, and a planar bracket 63 which forms the inner end wall. The top face 68 of the switchbox contains the IN/OUT switch 69 and a slot 70 for the handrail release lever 71. The rear face 72 of the switch box contains the UP/DOWN switch 73. As best shown in FIG. 11, the handrail release lever 71 pivots on pivot 74 located medially between its two ends adjacent its forward egde. It is biased in a vertically upright position by spring 75 and contains a partial circle recess 76 for receiving the rod 77 of the padded handrail 66. The handrail is pivoted at its inner end on pivot rod 78. Upon pushing the handrail release lever 71 forward, the handrail rod 77 is disengaged from the circular notch 76 and the handrail may then be dropped downwardly in its retracted position generally parallel to the housing 41 of the lifting mechanism assembly. This motion is shown by the arrow C in FIGS. 4 and 11. The outer end plate 79 of the switch box 61 has a U-shaped relieved portion 115 through which the handrail rod 77 can pass in its arcuate motion.

Figure 13:
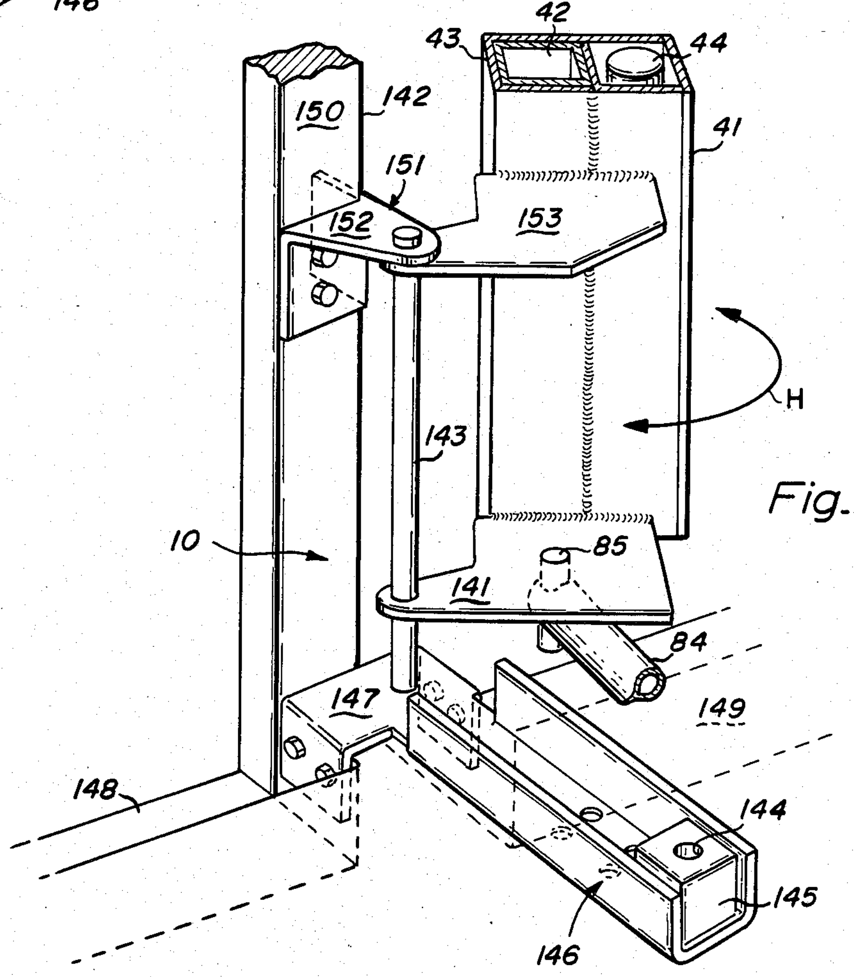
FIG. 13 is an elevation perspective of one preferred embodiment of a mounting bracket assembly for securing the wheelchair lift in a van.

FIGS. 2 and 9 show in more detail the vertically reciprocal lifting mechanisms assembly 40 and its operation. The housing 41 is generally rectangular in cross section (as best shown in FIG. 13). The housing is divided into two portions, one containing the hydraulic cylinder 44 for the vertical lift, and the second containing the receiving tube 43 for the slide tube 42 which moves up and down therein. The hydraulic cylinder reciprocating piston rod 121 has secured at its upper end a yoke 122 carrying a double groove pully assembly 47. The two heavy-duty chains 45 and 46 are secured at their upper end by connector 123 to bracket 124 at the upper end of the housing 41. As the piston rod 121 moves downwardly, the slide tube is raised in a 2-1 ratio. This is best shown by arrow G in FIGS. 1 and 9.

Figure 14:
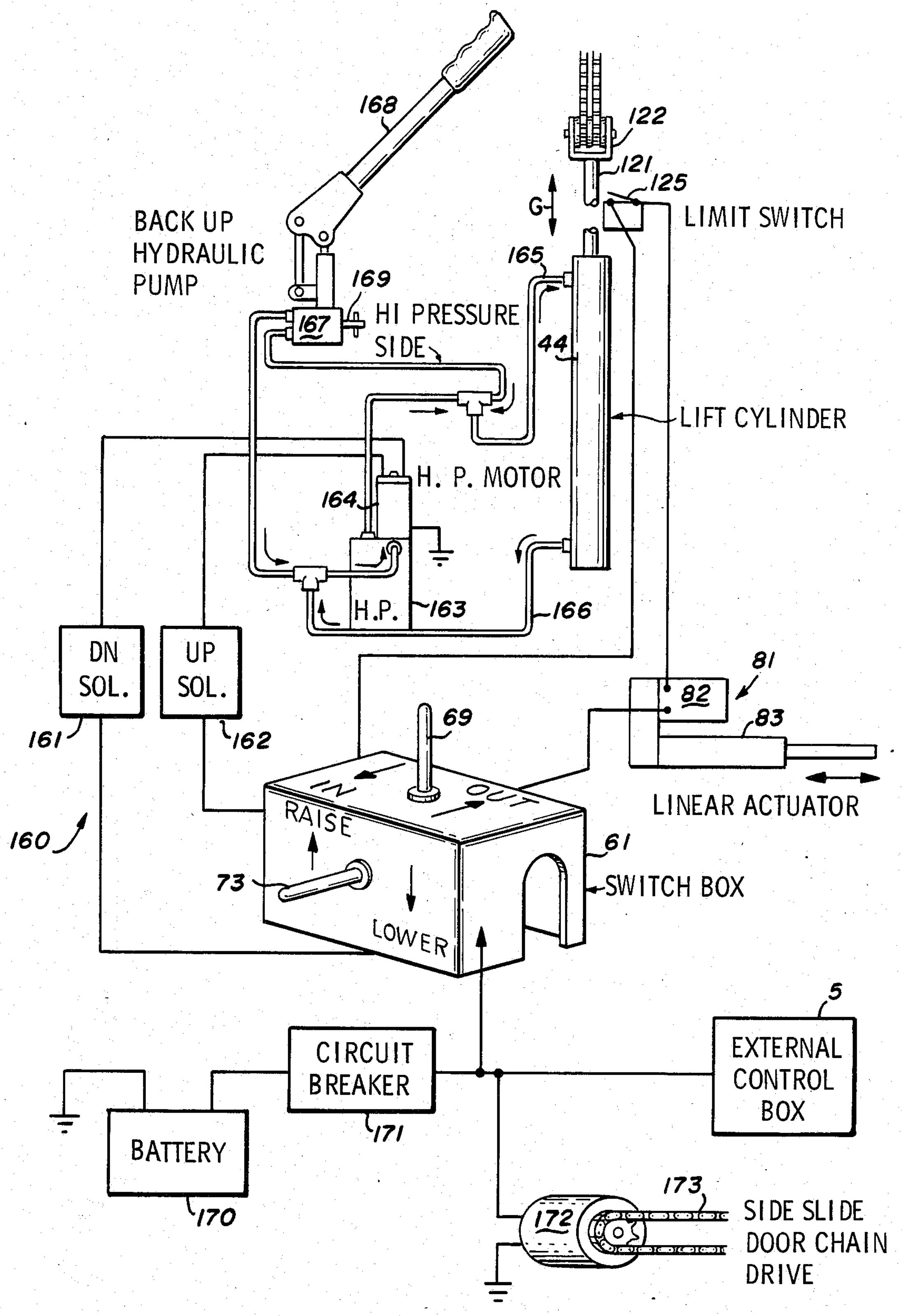
FIG. 14 is a schematic of the electrical control, hydraulic power, and linear actuator systems for the operation of the lift of this invention.

As the yoke 122 nears the bottom of its travel, it actuates a limit switch 125 mounted on the side wall of the housing 41 just adjacent the upper end of the hydraulic piston 44. This stops the vertical travel so that the bottom of the platform pan 21 is above the level of the van floor 2 The lead for the limit switch is shown at 126 in FIG. 2, while wire 116 is the power supply connecting the battery to the lift electronics 160 contained within housing 117, and wire 118 is the lead between the lift electronics and the control box 61. These wires are shown in FIGS. 1, 2, and 14.

The linear actuator assembly 80 is best shown in FIGS. 1, 2, 4 and 12. This assembly comprises a DC electromechanical linear actuator 81 having a motor 82 powering a parallel, linear (push-pull) actuator 83 which pivots at both ends. The actuator is a conventional actuator which is commercially available. It has an overload clutch with the travel limits, which indicate by a ratcheting noise that the actuator has reached its limits of travel either fully extended or fully retracted. The actuator push rod 84 exerts force on and pivots around pin 85 secured to the bottom swing arm 141 of the mounting bracket assembly. This is best seen in FIGS. 2 and 13. The center vertical axis of pin 85 is laterally offset from the central axis of the vertical swing arm pivot rod 143 so that the entire lift assembly is swung out and away from its retracted position to clear the door frame and jamb 142 of the van.

The interior end of the linear actuator 81 has a non-rotating mounting rod 86 extending therefrom, which has a vertical bore therethrough adapted to pivotally receive a securing pin 87 which engages hole 144 in mounting block 145 located at the interior end of the lower U-shaped mounting bracket 146. As shown best in FIGS. 2 and 4, the securing pin 87 has a crosspin handle at the upper end which permits removal, thus freeing the mounting rod 86. The entire linear actuator 81 can then be moved by hand to swing the lifting mechanism 40 around the axis of the swing arm pivot rod 143. This permits retraction or deployment of the platform by hand out of or into the vehicle in the event of a linear actuator malfunction, a dead battery in the vehicle, or other lack of power. The rotational swing of the lifting mechanism assembly and the platform is shown by arrow H in FIGS. 4 and 13.

The mounting bracket assembly 10 is best shown in conjunction with FIGS. 1, 2, 12 and 13. The lower mounting bracket 146 comprises an elongated plate, the outer end 147 of which is U-shaped in cross section concave down, whereas the remaining portion is U-shaped, concave up. The outer end portion 147 with the downward turned flanges forming the U-shape straddles the floor portion of the van between the front step well 148 and the rear step well 149. The two down-turned flanges are boltable to the side walls of the step-wells. Likewise, the medial portion of the lower mounting bracket 146 can be bolted vertically downwardly through the floor into the vehicle frame by the bolt holes shown medial the ends of the bracket.

The upper mounting bracket 151 is secured to the vertical side frame member 150 of the vehicle. As shown in FIG. 13, the bracket can wrap around one or more sides of the frame member. The upper mounting bracket 151 has a horizontal flange 152 adapted to receive the swing arm pivot rod 143 at its upper end.

The upper swing arm 153 is mounted to the swing arm pivot rod adjacent its upper end. Both the lower swing arm 141 and the upper swing arm 153 are secured to the housing 41, for example as shown, by welding. The space between the upper and lower swing arms 153, 141 receives the electronics and the hydraulic pump and motor assembly within housing 117 as best shown in FIG. 12.

Figure 12:
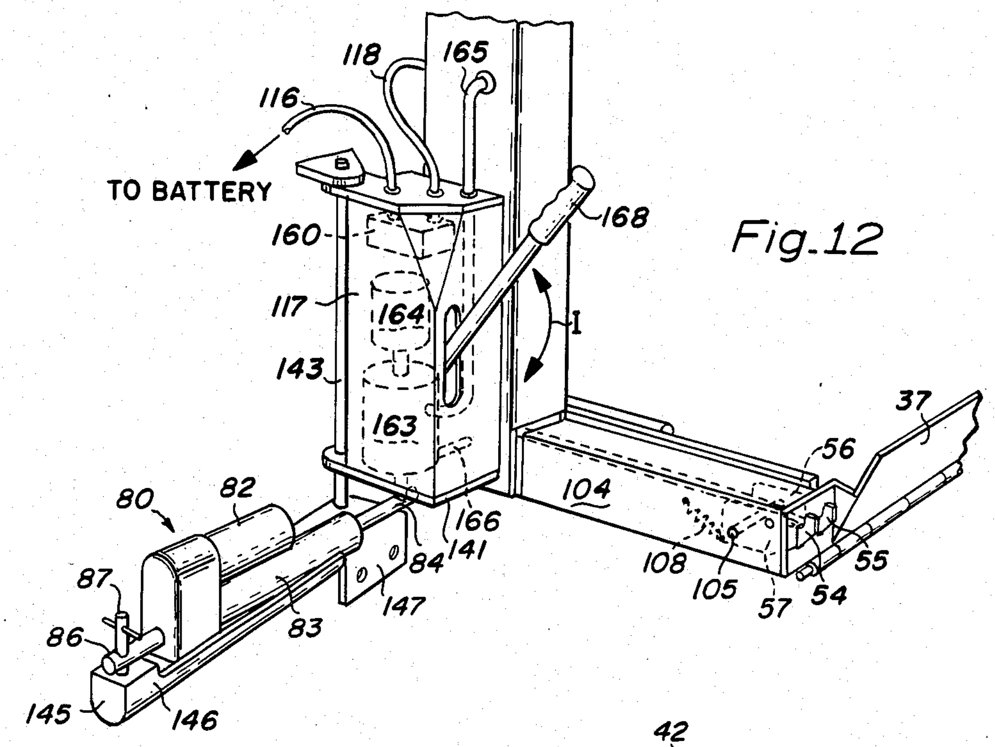
FIG. 12 is an elevation perspective of the auxiliary hydraulic assembly and rotary linear actuating mechanism.

The lead from the battery/alternator is shown in FIG. 12 as line 116. The electronics package 160 comprises a pair of solenoids as well as various wiring, connectors and the like, of conventional wiring configuration. The main hydraulic pump 163 is powered by an electric motor 164. High pressure line 165 and low pressure line 166 are connected to the lift cylinder 44. A hand actuated backup hydraulic pump 167 (see FIG. 14) is provided in the event of failure of the hydraulic pump, the pump motor, or the power supply thereto. It is actuated by a removable handlever 168. Relief valve 169 is provided to release pressure for lowering the lift from the raised position after having been pumped up to that position.

FIG. 14 shows a partially mechanical, partially electrical schematic diagram of the operating controls. Power for the system is provided by the battery/alternator 170 and the circuit is protected by circuit breaker 171. The system can be controlled by the external control panel 5 as above described. This system is also connected to motor 172 which drives a chain drive 173 to actuate the side sliding door of the van to open or close. Upon actuating the UP/DOWN switch 73 to the "RAISE" position, the up solenoid 162 actuates and the hydraulic pump 163 pressures the lift cylinder 44 to draw down the rod 121 pulling on yoke 122 and chains 45, 46. This in turn causes the slide tube 42 to retract upwardly into the receiving tube 43 raising the platform. When the platform is at its maximum height, the contact of yoke 122 with the limit switch 125 cuts off the lift cylinder power, and the IN/OUT switch may then be activated to rotatably retract the lift into the van, swinging it around the swing arm pivot rod axis 143. The UP/DOWN switch can then be activated to the "LOWER" position, activating the down solenoid 161 to lower the platform to the van floor and release the rear safety barrier/entry ramp 37 so that the wheelchair user can roll off the platform. For dismounting from the vehicle, the wheelchair user reverses the procedure: first rolling onto the platform, then triggering the UP/DOWN switch to the RAISE position which raises the platform slightly above the floor of the vehicle to permit clearance to swing the platform out of the van. Again the limit switch is triggered, and the IN/OUT switch 69 can be activated to power the linear actuator causing it to push the mounting bracket and platform assembly outwardly to the deployed position parallel to the outside of the van. The UP/DOWN switch can then be activated to lower the platform to the ground and deploy the entry ramp so the user can roll off the platform. The switches 69 and 73 are spring biased for return to neutral (off) position so that the user must keep constant pressure on the switch to continue movement of the lift. Likewise these functions can be controlled from the external control panel 5 which has a duplicate set of controls for the slide door and switches 69 and 73.

It should be understood that various modifications within the scope of this invention can be made by one of ordinary skill in the art without departing from the spirit thereof. For example, the switch box 61 may also contain a side slide door opening switch. We therefore wish our invention to be defined by the scope of the appended claims as broadly as the prior art will permit, and in view of this specification if need be.

We claim:

1. An improved wheelchair rotary lift assembly adapted to lift wheelchair users into a vehicle through a door opening in a side wall after a corresponding side door of said vehicle is opened, said vehicle having a floor for receiving said wheelchair, comprising in operative combination:

(a) a vertically reciprocable lifting mechamism assembly which includes:
   (i) a vertically oriented elongated load supporting member having an upper end and a lower end, and
   (ii) a housing for said load-supporting member adapted to receive said load supporting member in vertically reciprocable sliding engagement;
(b) a horizontally oriented platform support arm disposed connected to the lower end of said load-supporting member;
(c) a generally planar platform assembly adapted to receive a wheelchair thereon mounted on said platform support arm, said platform assembly having a longitudinal axis, a front edge and a back edge transverse to said axis, a front safety barrier member pivotally attached to said front edge, and a rear entry ramp member pivotaly attached to said back edge;
(d) a mounting bracket assembly adapted to be secured to the interior of said vehicle independent of said door to permit said vehicle side door to be opened without affecting a first inside retracted position of said lifting mechanism for access through said vehicle side door opening by an able-bodied person;
   (i) said lifting mechanism being mounted on said bracket assembly; and
   (ii) said bracket assembly including means for permitting rotation of said lifting mechanism assembly into and out of said vehicle through said door opening in said vehicle side wall around a vertical axis while maintaining said platform generally parallel to said floor of said vehicle;
(e) means for rotating said lifting mechanism approximately 90 degrees around said bracket assembly vertical axis from said first position retracted inside said vehicle in a position for immediately receiving a wheelchair, to a second position outside said vehicle,
(f) an elongated, horizontally oriented safety handrail assembly disposed transversely to the longitudinal axis of said platform assembly,
   (i) said handrail assembly including a handrail member having an inner and an outer end disposed above said wheelchair platform a distance sufficient to provide clearance for said wheelchair and permit grasping by a wheelchair user, and
   (ii) said handrail member being disposed secured to and adjacent the upper end of said load-supporting member and adapted to move vertically while maintaining said clearance above said platform; and
(g) said handrail assembly having means for permitting said handrail member to pivot down generally parallel to said vertically oriented elongated load support member to permit unrestricted access by an able-bodied person through the vehicle door opening when said platform is located in the inside retracted position.

2. An improved wheelchair lift as in claim 1 wherein: said handrail member includes means for engaging said front safety barrier adjacent its outer end to pivot said safety barrier into a position generally parallel with said planar platform assembly.

3. An improved wheelchair lift as in claim 2 wherein:
(a) said platform assembly includes a lower pan member and a platform extension member slidably mounted on said lower pan member permitting longitudinal extension of said platform to accommodate a variety of wheelchair sizes and types; and
(b) said front safety barrier includes means for locking said platform extension against movement with respect to said lower pan member upon engagement of said front safety barrier by said handrail engaging means.

4. An improved wheelchair lift as in claim 3 wherein said platform extension lock includes:
(a) an elongated member disposed on the rear face of said front safety barrier,
(b) an opening in each of said platform extension and said lower pan member aligned with each other and with said locking member, and
(c) said front safety barrier elongated member rotates backwardly and downwardly to pass through said extension opening to engage said lower pan member.

5. An improved wheelchair lift as in claim 3 wherein:
(a) said vehicle has a step recess along the bottom of said door opening;
(b) said lifting assembly is disposed in said mounting bracket assembly to permit said platform support arm to be received in said vehicle step recess when said platform is rotated into said vehicle to the retracted position.

6. An improved wheelchair lift as in claim 3 wherein:
(a) said rear entry ramp is rotatably mounted along the rear edge of said platform; and which includes;
(b) means to raise said entry ramp to a generally upright position prior to said support member moving vertically upwardly
(c) means for locking said rear entry ramp in a generally upright position during lifting to form a rear safety barrier;
(d) means for rotating said rear barrier downwardly into contact with pavement outside said vehicle or into contact with the vehicle floor inside the vehicle upon completion of downward descent motion.

7. An improved wheelchair lift as in claim 5 wherein:
(a) said rear entry ramp is rotatably mounted along the rear edge of said platform; and which includes:
(b) means to raise said entry ramp to a generally upright position prior to said support member moving vertically upwardly;
(c) means for locking said rear entry ramp in a generally upright position during lifting to form a rear safety barrier;
(d) means for rotating said rear barrier downwardly into contact with pavement outside said vehicle or into contact with the vehicle floor inside the vehicle upon completion of downward descent motion.

8. An improved wheelchair lift as in claim 1 wherein:
(a) said vehicle has a step recess along the bottom of said door opening
(b) said lifting assembly is disposed in said mounting bracket assembly to permit said platform support arm to be received in said vehicle step recess when said platform is rotated into said vehicle to the retracted position.

9. An improved wheelchair lift as in claim 1 wherein:
(a) said rear entry ramp is rotatably mounted along the rear edge of said platform; and which includes:
(b) means to raise said entry ramp to a generally upright position prior to said support member moving vertically upwardly;
(c) means for locking said rear entry ramp in a generally upright position during lifting to form a rear safety barrier;
(d) means for rotating said rear barrier downwarldy into contact with pavement outside said vehicle or into contact with the vehicle floor inside the vehicle upon completion of donward descent motion.

10. An improved wheelchair lift as in claim 1 wherein:
(a) said lifting mechanism includes:
(i) a hydraulic system having a reciprocably moveable rod,
(ii) said load support member comprises a hollow tube having an interior, said tube being slidably receivable in said housing and having a lower end, and
(iii) at least one lifting member engaged by said piston rod extending down the interior of said hollow tube and secured adjacent the lower end thereof;
(b) said piston rod and lifting member being arranged so that reciprocation of said rod causes said lifting member to raise or lower said hollow tube.

11. An improved wheelchair lift as in claim 10 wherein:
(a) there are at least two of said lifting members, a first of which is secured adjacent the lower end of said hollow tube;
(b) a second lifting member extends backward parallel to the longitudinal axis of said platform;
(c) said rear entry ramp is rotatably mounted along the rear edge of said platform, and said second lifting member is secured thereto to raise said entry ramp to a generally upright position prior to said support member moving vertically upwardly.

12. An improved wheelchair lift as in claim 11 which includes:
(a) means for locking said rear entry ramp in a generally upright position during lifting to form a rear safety barrier;
(b) means for rotating said rear barrier downwardly into contact with pavement outside said vehicle or into contact with the vehicle floor inside the vehicle upon completion of downward descent motion.

13. An improved wheelchair lift as in claim 12 wherein said locking means includes:
(a) a latch plate attached to an interior margin of said entry ramp having at least one slot therein, said second lifting member being attached theeto;
(b) at least one spring-biased pivotable plate having a latch tooth formed in a rear margin thereof releasably engageable with said latch plate slot;
(c) said pivot plate being engaged by said second lifting member to engage said latch tooth in said slot when said entry ramp is raised to an upright barrier position.

14. An improved wheelchair lift as in claim 13 wherein;
(a) said handrail member includes means for engaging said front safety barrier adjacent its outer end to pivot said safety barrier into a position generally parallel with said planar platform assembly;

(b) said platform assembly includes a lower pan member and a platform extension member slidably mounted on said lower pan member permitting longitudinal extension of said platform to accommodate a variety of wheelchair sizes and types; and
(c) said front safety barrier includes means for locking said platform extension against movement with respect to said lower pan member upon engagement of said front safety barrier by said handrail engaging means.

15. An improved wheelchair lift as in claim 14 wherein:
(a) said vehicle has a step recess along the bottom of said door opening;
(b) said lifting assembly is disposed in said mounting bracket assembly to permit said platform support arm to be received in said vehicle step recess when said platform is rotated into said vehicle to the retracted position.

16. An improved wheelchair assembly as in claim 15 wherein:
(a) said means for rotating said lifting mechanism around said bracket assembly vertical axis comprises a linear actuator pivotably secured at a first end thereof to said mounting bracket assembly, and means for pivotably engaging said linear actuator at a second outer end thereof to said lifting mechanism; and
(b) said rotation permitting means having a vertical axis disposed offset from a pivot axis of said linear actuator pivotably engaging means;

17. An improved wheelchair assembly as in claim 7 wherein:
(a) said means for rotating said lifting mechanism around said bracket assembly vertical axis comprising a linear actuator pivotably secured at a first inner end thereof to said mounting bracket assembly, and means for pivotably engaging said linear actuator at a second outer end thereof to said lifting mechanism; and
(b) said rotation permitting means having a vertical axis disposed offset from a pivot axis of said linear actuator pivotably engaging means.

18. An improved wheelchair lift as in claim 16 wherein:
(a) said linear actuator is disengageable from said mounting bracket to permit rotation by hand of said lifting mechanism into or out of said vehicle; and
(b) said hydraulic system includes a backup hand actuable hydraulic pump.

19. An improved wheelchair lift as in claim 17 wherein;
(a) said linear actuator is disengageable from said mounting bracket to permit rotation by hand of said lifting mechanism into or out of said vehicle; and
(b) said hydraulic system includes a backup and actuable hydraulic pump.

20. An improved wheelchair lift as in claim 1 wherein: said vehilce is a van and said mounting bracket assembly is secured to the floor of said van and at least one sidewall thereof.

21. An improved wheelchair lift as in claim 9 wherein: said vehicle is a van and said mounting bracket assembly is secured to the floor of said van and at least one sidewall thereof.

22. An improved wheelchair lift as in claim 7 wherein: said vehicle is a van and said mounting bracket assembly is secured to the floor of said van and at least one sidewall thereof.

23. An improved wheelchair lift as in claim 18 wherein: said vehicle is a van and said mounting bracket assembly is secured to the floor of said van and at least one sidewall thereof.

24. An improved wheelchair lift as in claim 19 wherein: said vehicle is a van and said mounting bracket assembly is secured to the floor of said van and at least one sidewall thereof.

25. An improved wheelchair lift as in claim 20 which includes:

an external control panel means for controlling the opening of said van door and the deployment of said lift from said van.

26. An improved wheelchair lift as in claim 21 which includes:

an external control panel means for controlling the opening of said van door and the deployment of said lift from said van.

27. An improved wheelchair lift as in claim 22 which includes:

an external control panel means for controlling the opening of said van door and the deployment of said lift from said van.

28. An improved wheelchair lift as in claim 23 which include:

an external control panel means for controlling the opening of said van door and the deployment of said lift from said van.

29. An improved wheelchair lift as in claim 24 which includes:

an external control panel means for controlling the opening of said van door and the deployment of said lift from said van.

* * * * *